(12) United States Patent
Okada et al.

(10) Patent No.: US 8,648,504 B2
(45) Date of Patent: Feb. 11, 2014

(54) VEHICLE DRIVE MOTOR

(75) Inventors: Koichi Okada, Iwata (JP); Takayoshi Ozaki, Iwata (JP); Yusuke Makino, Iwata (JP)

(73) Assignee: NTN Corporation, Osaka (JP)

( * ) Notice: Subject to any disclaimer, the term of this patent is extended or adjusted under 35 U.S.C. 154(b) by 336 days.

(21) Appl. No.: 12/998,001

(22) PCT Filed: Aug. 31, 2009

(86) PCT No.: PCT/JP2009/004252
§ 371 (c)(1),
(2), (4) Date: Mar. 3, 2011

(87) PCT Pub. No.: WO2010/026726
PCT Pub. Date: Mar. 11, 2010

(65) Prior Publication Data
US 2011/0156510 A1    Jun. 30, 2011

(30) Foreign Application Priority Data

Sep. 3, 2008  (JP) .................................. 2008-225562
Apr. 10, 2009 (JP) .................................. 2009-095424

(51) Int. Cl.
*H02K 9/19* (2006.01)
(52) U.S. Cl.
USPC .................................. 310/54; 310/58; 310/59
(58) Field of Classification Search
USPC ................................................ 310/54, 58, 59
See application file for complete search history.

(56) References Cited

U.S. PATENT DOCUMENTS

| 4,745,314 A | * | 5/1988 | Nakano ........................... 310/57 |
| 2002/0067086 A1 | | 6/2002 | Kikuchi et al. |

FOREIGN PATENT DOCUMENTS

| JP | 53-065507 | 11/1951 |
| JP | 54-005012 | 6/1952 |
| JP | 53-065507 | 6/1978 |
| JP | 54-005012 | 1/1979 |
| JP | 63-015152 | 2/1988 |
| JP | 3-86765 | 9/1991 |
| JP | 09-154258 | 6/1997 |
| JP | 2002-165410 | 6/2002 |
| JP | 2002186221 A * | 6/2002 ............ H02K 9/19 |
| JP | 2003-250247 | 9/2003 |
| JP | 2006-033916 | 2/2006 |
| JP | 2007-306751 | 11/2007 |
| JP | 2007-312497 | 11/2007 |

OTHER PUBLICATIONS

JP 2002186221 A machine translation, Jul. 15, 2013.*

(Continued)

*Primary Examiner* — Tran Nguyen
*Assistant Examiner* — Leda Pham (57) ABSTRACT

A vehicle drive motor, capable of efficiently cooling the motor stator without being accompanied by an increase in size, includes a stator having an annular stator core, provided in an inner periphery of a tubular motor casing, and a stator coil provided in the stator core, and a rotor on an inner side of the stator core and rotatable relative to the stator. The motor casing includes an oil supply passage and an oil discharge passage in the motor casing and opening at an inner diametric surface of the motor casing, which are opposite axially to each other. Stator core grooves communicated with the oil supply passage and the oil discharge passage extend axially in an outer diametric surface of the stator core. Accordingly, lubricant oil may flow from the oil supply passage towards the oil discharge passage through the stator core groove.

8 Claims, 6 Drawing Sheets

(56) References Cited

OTHER PUBLICATIONS

Chinese Office Action issued Oct. 10, 2012 in corresponding Chinese Patent Application No. 200980134345.3.
Chinese Office Action mailed Mar. 12, 2013 for corresponding Chinese Application No. 200980134345.3.
International Search Report for PCT/JP2009/004252, mailed Nov. 10, 2009.
English Translation of the International Preliminary Report on Patentability mailed Apr. 21, 2011 in corresponding International Patent Application PCT/JP2009/004252.
Japanese Notification of Reasons for Rejection issued Aug. 6, 2013 in corresponding Japanese Patent Application No. 2009-095424.
Chinese Office Action issued Aug. 5, 2013 in corresponding Chinese Patent Application No. 200980134345.3.

* cited by examiner

VEHICLE DRIVE MOTOR

CROSS REFERENCE TO RELATED APPLICATIONS

This application claims the benefit under 35 U.S.C. Section 371, of PCT International Application No. PCT/JP2009/004252, filed Aug. 31, 2009, which claimed priority to Japanese Application No. 2008-225562, filed Sep. 3, 2008, and No. 2009-095424, filed Apr. 10, 2009, in the Japanese Patent Office, the disclosures of which are hereby incorporated by reference.

BACKGROUND OF THE INVENTION

1. Field of the Invention

The present invention relates to a vehicle drive motor that may be used as a drive source in various motor driven vehicles such as, for example, automotive vehicle and railroad vehicles.

2. Description of Related Art

The vehicle drive motor, particularly the drive motor used as a drive source in an electric car or a hybrid car is required to have not only a compact and lightweight feature, but also a capability of providing the maximum output for energy saving purpose. Where a high power motor is desired to be downsized, a major problem arises as to how the heat emission resulting from a loss thereof is alleviated. In this kind of the vehicle drive motor, an attempt has been made to use a system of cooling the motor rotor with a lubricant oil.

[Patent Document 1] JP Laid-open Patent Publication No. H09-154258

SUMMARY OF THE INVENTION

While it is very important in the vehicle drive motor to alleviate heat emission occurring in a stator coil as a result of the flow of a large electric current therethrough, no structure for alleviating heat emission in the stator coil while avoiding an increase in size has yet been developed. Also, while in the vehicle drive motor a reduction gear unit or the like is often integrated therewith and both of a water cooling system and an oil cooling system with a lubricant oil are therefore concurrently employed, this tends to result in an increase of the size of the motor casing, thus constituting a factor for hampering the reduction in size.

An object of the present invention is to provide a vehicle drive motor capable of efficiently cooling the motor stator without being accompanied by an increase in size.

The vehicle drive motor according to the present invention includes a stator, including an annular stator core, provided in an inner periphery of a tubular motor casing, and a stator coil provided in the stator core; a rotor positioned on an inner peripheral side of the stator core and rotatable relative to the stator; an oil supply passage and a oil discharge passage provided in the motor casing and opening at respective locations on an inner diametric surface of the motor casing, which are opposite to each other in an axial direction; and one or more stator core grooves provided in an outer diametric surface of the stator core so as to extend in the axial direction and communicated with the oil supply passage and the oil discharge passage, in which a lubricant oil is allowed to flow from the oil supply passage towards the oil discharge passage through the stator core groove or grooves.

According to the foregoing construction, the lubricant oil supplied to the oil supply passage in the motor casing is introduced into one end of the stator core groove, defined in the outer diametric surface of the stator so as to extend axially, and then to the opposite end of the stator core groove and is finally discharged to the outside through the oil discharge passage. When a plurality of the stator core grooves are provided in the outer diametric surface of the stator core in a fashion, for example, spaced an equal distance from each other in the circumferential direction, the entire structure need not be increased in size and heat emission emanating from the stator coil in a short length of time can be promptly transmitted to any other component parts and any entire external cooling members to thereby increase the cooling efficiency of the stator. Also, since the stator need not have any complicated structure only for the purpose of cooling, the surface area contributing to an external cooling can be secured and the efficiency of external air cooling or external water cooling can be increased.

In one embodiment of the present invention, the oil discharge passage may include an axially extending oil supply passageway, which is defined so as to extend from one end face of the motor casing in the axial direction, and a circumferentially grooved oil supply passageway, which is defined in the inner diametric surface of the motor casing so as to extend in a circumferential direction and is communicated with the axially extending oil supply passageway, and the oil discharge passage may include an axially extending oil discharge passageway, which is defined so as to extend from the opposite end face of the motor casing in the axial direction, and a circumferentially grooved oil discharge passageway, which is defined in the inner diametric surface of the motor casing so as to extend in the circumferential direction and is communicated with the axially extending oil discharge passageway.

In the case of the foregoing construction, the lubricant oil supplied to the oil supply passage flows in the circumferential direction through the circumferentially grooved oil supply passageway and, therefore, the lubricant oil can be distributed so as to flow through the plural stator core grooves in the circumferential direction, if the plurality of the stator core grooves are provided in the outer diametric surface of the stator core in a fashion, for example, spaced equidistantly from each other in the circumferential direction. Also, the lubricant oil having flowed in the stator core groove subsequently flows in the circumferential direction through the circumferentially grooved oil discharge passageway and is then collected in the axially extending oil discharge passageway. Accordingly, with a simplified structure, the lubricant oil can be flowed uniformly over the entire outer diametric surface of the stator core and, therefore, the cooling efficiency can be further increased.

In one embodiment of the present invention, the stator core groove may be defined in the stator core so as to extend from one end of the stator core to the opposite end thereof, and may have opposite ends closed by respective ring shaped lid members provided on opposite ends of the stator core.

In one embodiment of the present invention, the stator core groove may be defined in the stator core so as to extend from one end of the stator core to the opposite end thereof, one of opposite ends of the stator core groove being closed by a ring shaped lid member provided on one end of the stator core while the other of the opposite ends of the stator core groove is closed by a stepped face of a reduced diameter portion formed in the inner diametric surface of the motor casing, the reduced diameter portion having a diameter smaller than that of a portion of the inner diametric surface of the motor casing, on which the stator core is mounted, and the stator core may be fixed to the motor casing by means of a bolt passing axially from the lid member and over the stator core groove and then threaded into the motor casing reduced diameter portion.

In the case of the foregoing construction, in order to fix the stator core to the inner periphery of the motor casing, the stator core grooves may be used as insertion holes for receiving the respective bolts without employing any complicated structure in one or both of the motor casing and the stator core, thereby facilitating the fixing of the stator core to the inner periphery of the motor casing.

In one embodiment of the present invention, each of the lid members for closing the opposite ends of the stator core groove may be provided with a coil cooling hole or groove communicated with the stator core groove so as to open towards the stator coil. In the case of the construction described above, a portion of the lubricant oil supplied from the oil supply passage to the stator core groove can be injected onto the stator coil, which is a source of heat emission, through the hole or groove in each of the lid members and, therefore, the stator coil can be cooled directly, resulting in a yet further increase of the cooling efficiency of the stator.

In one embodiment of the present invention, each of the lid members for closing the opposite ends of the stator core groove may be of an L-sectioned configuration having a transverse piece portion that extends axially and is held in engagement with an end face of the stator core, and an upright piece portion that extends radially and is engaged with the inner diametric surface of the motor casing, and the oil supply passage may include an axially extending oil supply passageway defined so as to extend axially from one end face of the motor casing, and a radially extending oil supply passageway extending radially so as to open at the inner diametric surface of the motor casing at a position inside of the lid member, and the oil discharge passage may include an axially extending oil discharge passageway defined so as to extend axially from the opposite end face of the motor casing, and a radially extending oil discharge passageway extending radially so as to open at the inner diametric surface of the motor casing at a position inside of the lid member.

In the case of the foregoing construction, the lubricant oil supplied to the oil supply passage is introduced from the radially extending oil supply passageway of the oil supply passage towards one end side of the stator core groove through a ring shaped internal cavity defined in the lid member for closing one end of the stator core groove. The lubricant oil flowing to the opposite end of the stator core groove is discharged from the radially extending oil discharge passageway of the oil discharge passage through the ring shaped internal cavity defined in the lid member for closing that one end of the stator core groove. In other words, the ring shaped internal cavity in the lid member used to close the one end of the stator core groove defines a path through which the lubricant oil introduced from the oil supply passage can be distributed and supplied into the stator core grooves that are equidistantly distributed in the circumferential direction and, also, the ring shaped internal cavity in the lid member used to close the opposite end of each of the stator core groove similarly defines a path through which the lubricant oil flowing past the stator core groove can be collected in the radially extending oil discharge passageway of the oil discharge passage. Because of this, neither the circumferentially grooved oil supply passageway nor the circumferentially grooved oil discharge passageway, both extending in the circumferential direction, need be provided in the inner diametric surface of the motor casing as respective parts of the oil supply passage and the oil discharge passage and, therefore, the flow path for the lubricant oil can be constructed easily.

In the case of the construction described above, each of the lid members for closing the opposite ends of the stator core groove may be provided with a coil cooling hope opening towards the stator coil. Even in this case, a portion of the lubricant oil supplied from the oil supply passage to the stator core groove can be injected onto the stator coil, which forms a source of heat emission, through the hole in the lid member and, therefore, the stator coil can be cooled directly, resulting in a yet further increase of the cooling efficiency of the stator.

In one embodiment of the present invention, the stator may be of a structure including individual core portions arranged circumferentially, with a stator coil being wound around those core portions, in which case a portion delimited between the neighboring individual core portions is molded with a filler having a high thermal conductivity.

When that portion of the stator core between the neighboring core portions is molded with the filler having a high thermal conductivity, heat emission emanating from a portion of the stator, which cannot be cooled with the lubricant oil, can be dissipated towards the stator core having a high heat capacity, accompanied by a further increase of an effect of heat dissipation.

The stator employed in the vehicle drive motor of one embodiment of the present invention may be of a structure including individual core portions arranged circumferentially, each individual core portion having a stator teeth wound with the stator coil; and further including a ring shaped stator covering for covering the entire inner periphery of the stator except for the stator teeth, and the opposite end faces of such stator, having an outer peripheral edge held in tight contact with an inner peripheral surface of the motor casing; and the oil supply passage and the oil discharge passage may be spaced axially from each other and may be made open towards a cavity formed inside the stator covering and the motor casing at respective portions of the inner diametric surface of the motor casing, so that the lubricant oil is supplied from the oil supply passage and concurrently serves as a cooling oil allows the stator and the stator coil to be immersed within an oil pool filled within the cavity.

As described above, where the entire stator, excluding the inner periphery of the individual core portions, is covered by the stator covering and an oil cooling structure is designed, in which the entire stator coil and a major part of the stator core are immersed in the oil bath, the cooling of the stator can be accomplished yet further efficiently.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1A:
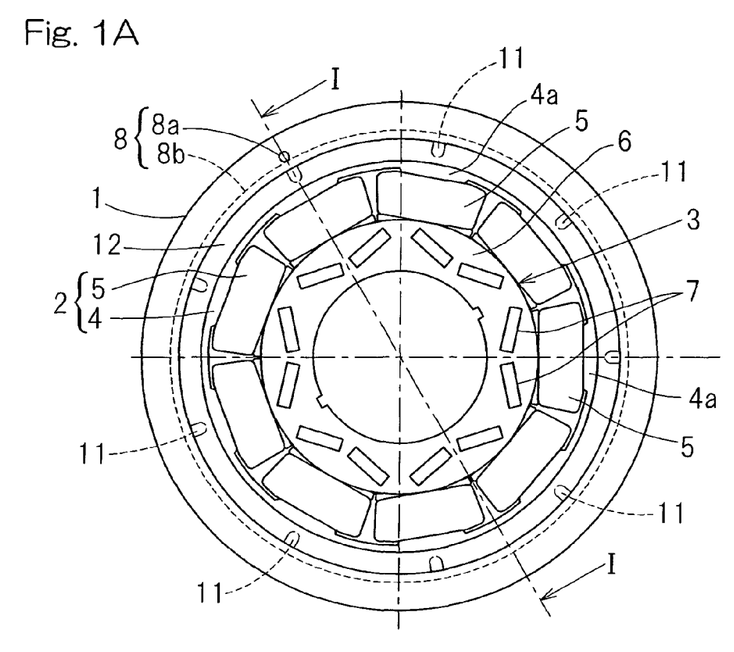
FIG. 1A is a front elevational view showing a vehicle drive motor according to a first embodiment of the present invention.
Figure 1B:
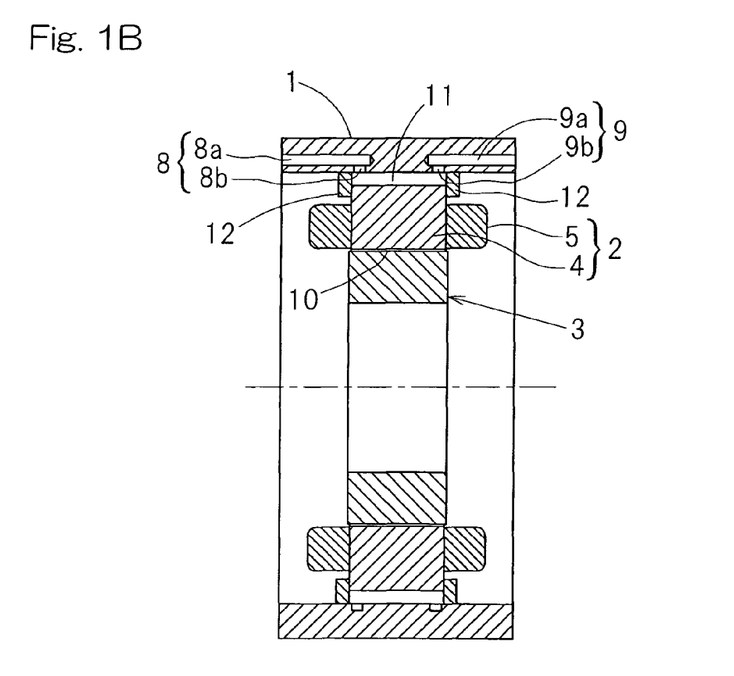
FIG. 1B is a cross sectional view taken along the line I-I in FIG. 1A.

The first embodiment of the present invention will now be described with particular reference to FIGS. 1A and 1B. FIG. 1A illustrates a front elevational view of a vehicle drive motor according to the first embodiment and FIG. 1B illustrates a cross sectional view taken along the line I-I in FIG. 1A. The vehicle drive motor shown therein includes a stator 2, provided in an inner periphery of a tubular motor casing 1, and a rotor 3 positioned on an inner peripheral side of the stator 2 and capable of rotating relative to the stator 2.

The stator 2 is made up of an annular stator core 4, provided in the inner periphery of the motor casing 1, and a stator coil 5 provided in the stator core 4. More specifically, the stator core 4 includes a plurality of individual core portions 4a arranged circumferentially, which are wound with coil 5. The stator coil 5 is of a non-molded structure. In other words, the stator coil 5 is not molded and the coil winding is exposed.

The rotor 3 is of such a structure that permanent magnets 7 are arranged circumferentially in the annular rotor core 6. This vehicle drive motor is rendered to be a radial gap type motor, in which a radially oriented gap area 10 is provided between the rotor core 6 and the stator core 4.

As best shown in FIG. 1B, the motor casing 1 is provided with an oil supply passage 8, through which a lubricant oil as a liquid coolant is supplied from the outside towards the stator 2, and an oil discharge passage 9, through which the lubricant oil used to cool the stator 2 is recovered. The oil supply passage 8 includes an axially extending oil supply passageway 8a, defined so as to extend from one end surface (left end face as viewed in FIG. 1B) of the motor casing 1 in an axial direction, and a circumferentially grooved oil supply passageway 8b defined in an inner diametric surface of the motor casing 1 so as to extend in a circumferential direction and communicated with the axially extending oil supply passageway 8a. The oil discharge passage 9 referred to above includes an axially extending oil discharge passageway 9a, defined so as to extend from the opposite end face (right end face as viewed in FIG. 1B) of the motor casing 1 in the axial direction, and a circumferentially extending oil discharge passageway 9b defined in the inner diametric surface of the motor casing 1 so as to extend in the circumferential direction and communicated with the axially extending oil discharge passageway 9a.

The stator core 4 has an outer diametric surface formed with a plurality of axially extending stator core grooves 11 spaced equidistantly from each other in the circumferential direction. Each of those stator core grooves 11 is defined so as to extend from one end of the stator core 4 to the opposite end thereof and the opposite ends of each of those stator cores 11 are closed by respective ring shaped lid members 8b provided at those ends of the stator core 4. The circumferentially grooved oil supply passageway 8b of the oil supply passage 8 in the motor casing 1 is in the form of an opening arranged at an axial position on one end side of the stator core grooves 11. Also, the circumferentially grooved oil discharge passageway 9b of the oil discharge passage 9 in the motor casing 1 is in the form of an opening arranged at an axial position on the opposite end side of the stator core grooves 11. Accordingly, the lubricant oil introduced from the oil supply passage 8 can be supplied towards the one end side of each of the stator core grooves 11 that are equidistantly spaced from each other in the direction circumferentially of the stator core 4. Also, the lubricant oil supplied to each of the stator core grooves 11 is discharged from the opposite end side of each of the stator core grooves 11 to the outside through the oil discharge passage 9.

According to the vehicle drive motor of the structure described hereinabove, for example, when the lubricant oil, which is the liquid coolant, is supplied under pressure from the outside to the oil supply passage 8 in the motor casing 1 through an oil supply tube (not shown), such lubricant oil is introduced into one end of each of the stator core grooves 11, which are provided in the outer diametric surface of the stator core 4 and spaced equidistantly from each other in the circumferential direction, through the circumferentially grooved oil supply passageway 8b of the oil supply passage and subsequently flows towards the opposite end of each of the stator core grooves 11. The lubricant oil so supplied is then discharged from the circumferentially grooved oil discharge passageway 9b of the oil discharge passage 9 to the outside through the axially extending oil discharge passageway 9a. Accordingly, without the structure as a whole being increased in size, heat emission occurring in the stator coil 5 in a short length of time can be promptly transmitted to the other component parts the entire cooling member of the outside, resulting in increase of the cooling efficiency of the stator 2. Also, since the stator 2 need not have complicated structure only for cooling purpose, the area that contributes to the external cooling can be secured and the efficiency of external air cooling or external water cooling can be increased.

In addition, in the embodiment hereinabove described, since the oil supply passage 8 is made up of the axially extending oil supply passageway 8a, defined so as to extend from one end surface of the motor casing 1 in the axial direction, and the circumferentially grooved oil supply passageway 8b defined in the inner diametric surface of the motor casing 1 so as to extend in the circumferential direction and communicated with the axially extending oil supply passageway 8a, the lubricant oil supplied to the oil supply passage 8 can flow in the circumferential direction through the circumferentially grooved oil supply passageway 8b and can then be distributed into and flow through the plurality of the stator cores 11 defined in the outer diametric surface of the stator core 4 so as to be equidistantly spaced from each other in the circumferential direction.

Yet, since the oil discharge passage 9 is made up of the axially extending oil discharge passageway 9a, defined so as to extend from the opposite end face of the motor casing 1 in the axial direction, and the circumferentially extending oil discharge passageway 9b defined in the inner diametric surface of the motor casing 1 so as to extend in the circumferential direction and communicated with the axially extending oil discharge passageway 9a, the lubricant oil flowing through the stator core grooves 11 can flow through the circumferentially grooved oil discharge passageway 9b in the circumferential direction and can then be collected in the axially extending oil discharge passageway 9a. Accordingly, with the structure simplified, the lubricant oil can be uniformly distributed over the entire outer diametric surface of the stator core, resulting in a further increase of the cooling efficiency.

Figure 2A:
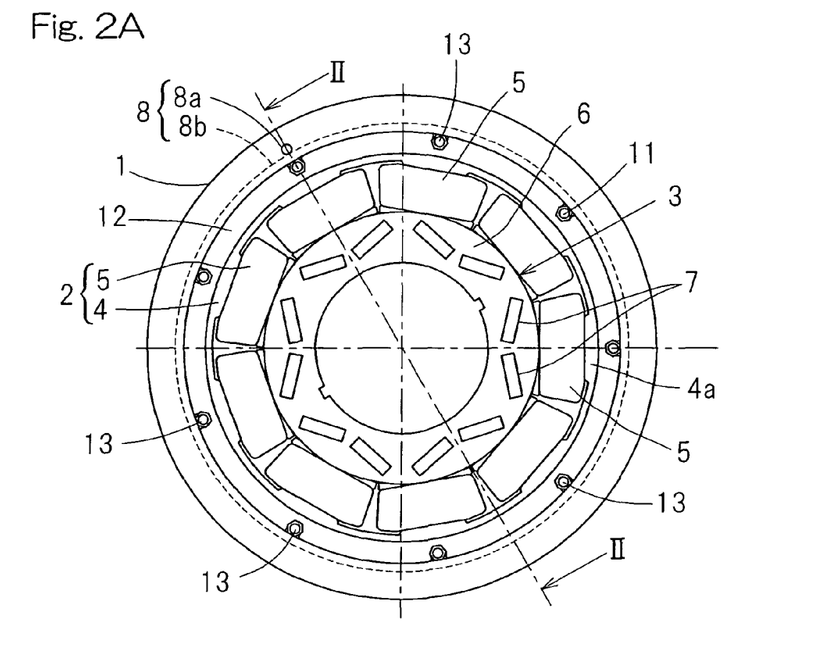
FIG. 2A is a front elevational view showing the vehicle drive motor according to a second embodiment of the present invention.
Figure 2B:
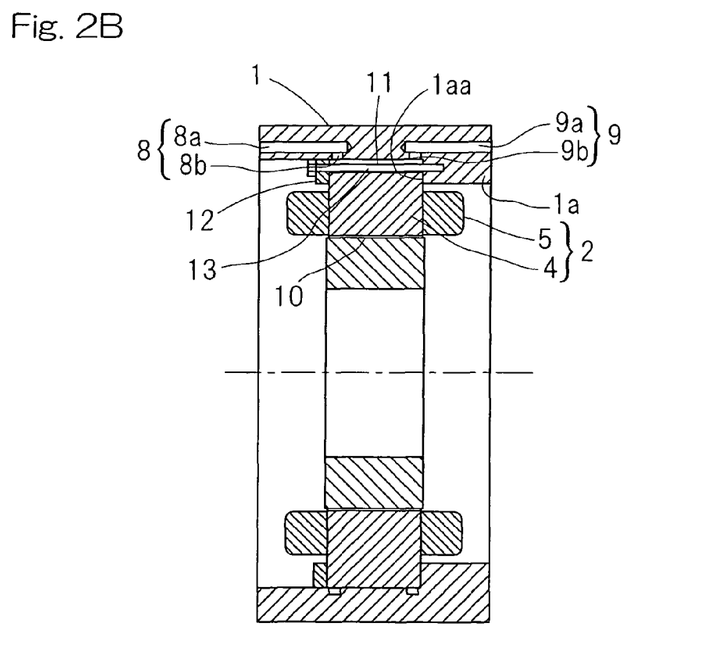
FIG. 2B is a cross sectional view taken along the line II-II in FIG. 2A.

FIGS. 2A and 2B illustrate a second embodiment of the present invention. FIG. 2A illustrates a front elevational view of the vehicle drive motor according to the second embodiment and FIG. 2B illustrates a cross sectional view taken along the line II-II in FIG. 2A. The vehicle drive motor shown therein is similar to that according to the first embodiment shown in and described with particular reference to FIGS. 1A and 1B, but differs therefrom in that the inner diametric surface of the motor casing 1 is provided with on one end side a reduced diameter portion 1a having its diameter smaller than that of a portion on the other end side of the inner diametric surface of the motor casing 1 on which the stator core 4 is mounted, so that the opposite end of each of the stator core grooves 11 can be closed by a radially stepped annular face 1aa of the reduced diameter portion 1a, which confronts the stator core 4. One end of each of the stator core grooves 11, which is opposite to the opposite end referred to above, is closed by the ring shaped lid member 12 in a manner similar to that described in connection with the embodiment shown in FIGS. 1A and 1B. In addition, the stator core 4 is fixed to the inner periphery of the motor casing 1 by threading a plurality of bolts 13, which have been axially passed from the lid members 12 into the respective stator core grooves 11, into the reduced diameter portion 1a integral with the motor casing 1. Other structural features than those described above are similar to those shown in and described with reference to FIGS. 1A and 1B in connection with the first embodiment.

In the case of the second embodiment, in order to fix the stator core 4 to the inner periphery of the motor casing 1, the stator core grooves 11 are used as insertion holes for receiving the respective bolts 13 without employing any complicated structure in one or both of the motor casing 1 and the stator core 4, thereby facilitating the fixing of the stator core 4 to the inner periphery of the motor casing 1.

Figure 3A:
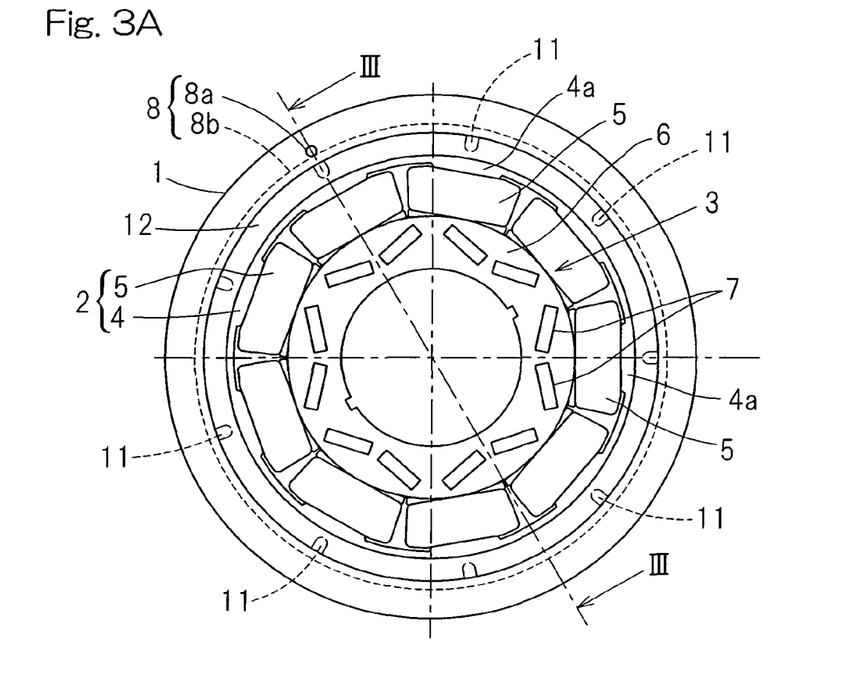
FIG. 3A is a front elevational view showing the vehicle drive motor according to a third embodiment of the present invention.
Figure 3B:
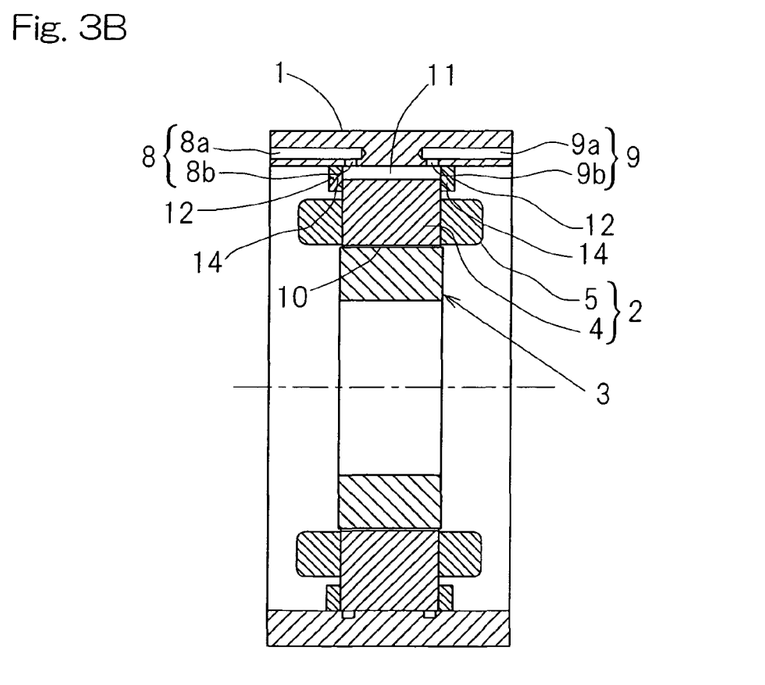
FIG. 3B is a cross sectional view taken along the line in FIG. 3A.

FIGS. 3A and 3B illustrate a third embodiment of the present invention. FIG. 3A is a front elevational view showing the vehicle drive motor according to the third embodiment and FIG. 3B is a cross sectional view taken along the line III-III in FIG. 3A. The vehicle drive motor shown therein is similar to that according to the first embodiment shown in and described with particular reference to FIGS. 1A and 1B, but differs therefrom in that the ring shaped lid members 12 for closing the respective opposite ends of each of the stator core grooves 11 are provided with respective cooling holes 14 communicated with the corresponding stator core groove 11 and opening towards the stator coil 5. It is, however, to be noted that in place of the cooling holes 14, grooves may be employed which open towards the stator coil 5. Other structural features than those described above are similar to those shown in and described with reference to FIGS. 1A and 1B in connection with the first embodiment.

In the case of this third embodiment, a portion of the lubricant oil supplied from the oil supply passage 8 towards the stator core grooves 11 can be injected onto the stator core coil 5, which forms a source of heat emission, from the holes 14 (or the grooves) in the lid members 12, and, therefore, the stator coil 5 can be cooled directly, resulting in a further increase of the cooling efficiency of the stator 2.

Figure 4A:
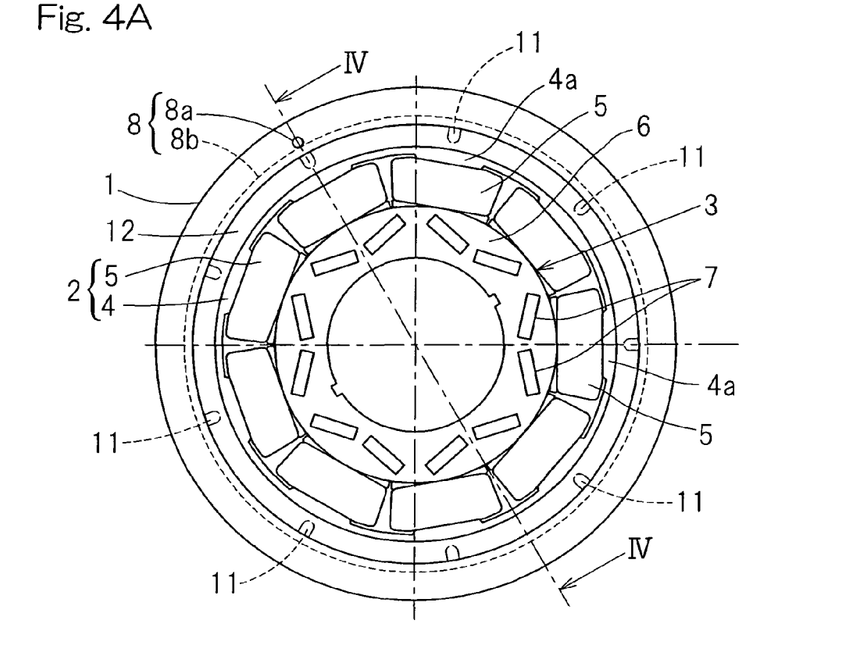
FIG. 4A is a front elevational view showing the vehicle drive motor according to a fourth embodiment of the present invention.
Figure 4B:
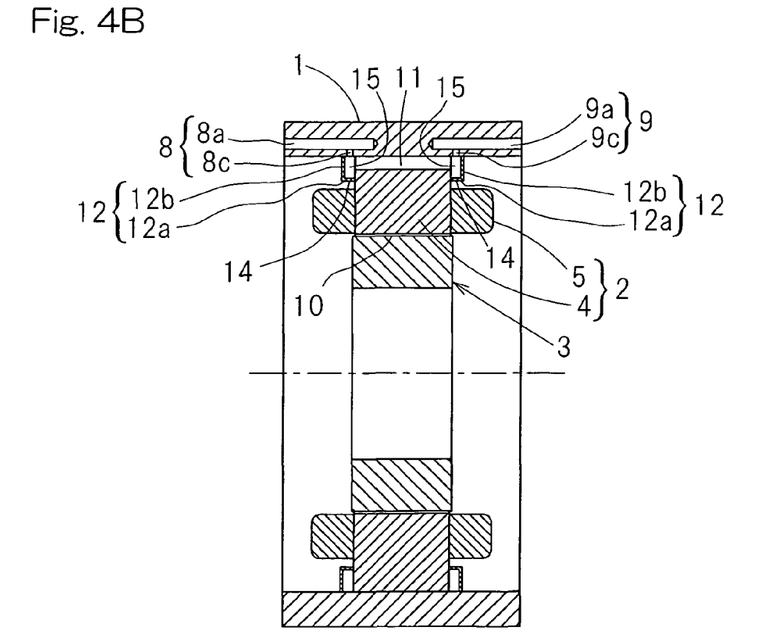
FIG. 4B is a cross sectional view taken along the line IV-IV in FIG. 4A.

FIGS. 4A and 4B illustrate a fourth embodiment of the present invention. FIG. 4A is a front elevational view showing the vehicle drive motor according to the fourth embodiment and FIG. 4B is a cross sectional view taken along the line IV-IV in FIG. 4A. The vehicle drive motor shown therein is similar to that according to the first embodiment shown in and described with particular reference to FIGS. 1A and 1B, but differs therefrom in that each of the ring shaped lid members 12 for closing the respective opposite ends of each of the stator core grooves 11 is of an L-sectioned configuration including a transverse piece portion 12a, which extends in the axial direction and is held in engagement with the adjacent end face of the stator core 4, and an upright piece portion 12b extending in the radial direction and engaged with the inner diametric surface of the motor casing 1. Also, the oil supply passage 8 defined in the motor casing 1 is made up of an axially extending oil supply passageway 8a, defined so as to extend from one end surface of the motor casing 1 in an axial direction, and a radially extending oil supply passageway 8c defined in communication with the axially extending oil supply passageway 8a and extending in the radial direction so as to open at the inner diametric surface of the motor casing 1 at a position inside of the lid member 12. Yet, the oil discharge passage 9 similarly defined in the motor casing 1 is made up of an axially extending oil discharge passageway 9a, which is defined so as to extend from the opposite end face of the motor casing 1 in the axial direction, and a radially extending oil discharge passageway 9c defined in communication with the axially extending oil discharge passageway 9a and extending in the radial direction so as to open at the inner diametric surface of the motor casing 1 at a position inside of the lid member 12. The lid member 12 is provided with a cooling hole 14 opening towards the stator coil 5. Other structural features than those described above are similar to those shown in and described with reference to FIGS. 1A and 1B in connection with the first embodiment.

In the case of the fourth embodiment, the lubricant oil supplied under pressure from the outside into the oil supply passage 8 of the motor casing 1 is introduced from the radially extending oil supply passageway 8c of the oil supply passage 8 into the one end side of each of the stator core grooves 11 through a ring shaped internal cavity 15 in the lid member 12 used to close the one end of each of the stator core groove 11. The lubricant oil flowing to the opposite end of each of the stator core grooves 11 is discharged from the radially extending oil discharge passageway 9c of the oil discharge passage 9 through the ring shaped internal cavity 15 in the lid member 12 used to close the opposite end of each of the stator core grooves 11.

As hereinabove described, in the fourth embodiment, the ring shaped internal cavity 15 in the lid member 12 used to close the one end of each of the stator core grooves 11 defines a path through which the lubricant oil introduced from the oil supply passage 8 can be distributed and supplied into each of the stator core grooves 11 that are equidistantly distributed in the circumferential direction. Also, the ring shaped internal cavity 15 in the lid member 12 used to close the opposite end of each of the stator core grooves 11 defines a path through which the lubricant oil flowing past each of the stator core grooves 11 can be collected in the radially extending oil discharge passageway 9c of the oil discharge passage 9. Because of this, as shown in FIGS. 1A and 1B, neither the circumferentially grooved oil supply passageway 8b nor the circumferentially grooved oil discharge passageway 9b, both extending in the circumferential direction, need be provided in the inner diametric surface of the motor casing 1 as respective parts of the oil supply passage 8 and the oil discharge passage 9 and, therefore, the flow path for the lubricant oil can be constructed easily.

A portion of the lubricant oil supplied from the oil supply passage 8 into the stator core grooves 11 is injected from the hole 14 of the respective lid member 12 onto the stator coil 5 to thereby directly cool the stator coil 5, similarly to the third embodiment already described with particular reference to FIGS. 3A and 3B.

Figure 5A:
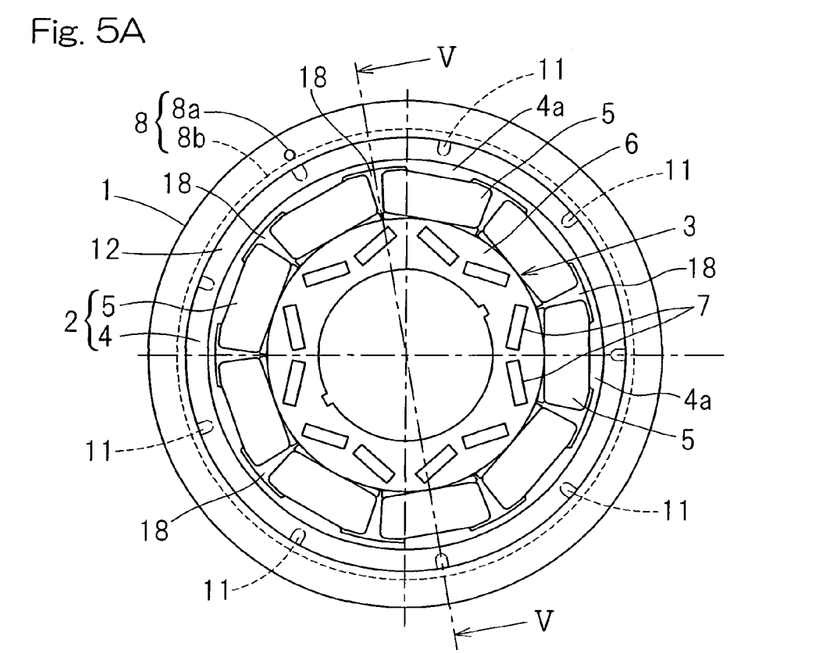
FIG. 5A is a front elevational view showing the vehicle drive motor according to a fifth embodiment of the present invention.
Figure 5B:
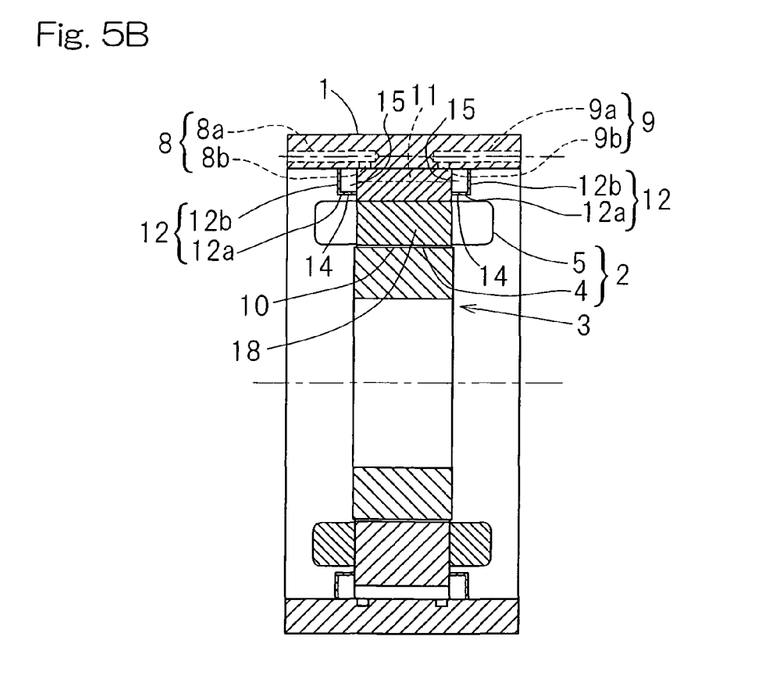
FIG. 5B is a cross sectional view taken along the line V-V in FIG. 5A.

FIGS. 5A and 5B illustrate a fifth embodiment of the present invention. FIG. 5A is a front elevational view showing the vehicle drive motor according to the fifth embodiment and FIG. 5B is a cross sectional view taken along the line V-V in FIG. 5A; The vehicle drive motor shown therein is similar to, for example, that according to the fourth embodiment shown in and described with particular reference to FIGS. 4A and 4B, but differs therefrom in that a portion of the stator core 4 delimited between the neighboring core portions 4a and 4a is molded with a filler 18 having a high thermal conductivity.

As a material used for the filler 18 having a high thermal conductivity, any of molding resins, which is lower in high thermal conductivity than typical high thermal conductivity is acceptable and, for example, a material of a kind in which carbon or ceramics for increasing the thermal conductivity is mixed in a resinous material, may be suitably employed.

It is to be noted that the oil supply passage 8 is made up of an axially extending oil supply passageway 8a extending in the axial direction from one end face of the motor casing 1, and a circumferentially grooved oil supply passageway 8b communicated with the axially extending oil supply passageway 8a and provided in the inner diametric surface of the motor casing 1 so as to extend in the circumferential direction. The oil discharge passage 9 is made up of an axially extending oil discharge passageway 9a, extending in the axial direction from the opposite end face of the motor casing 1, and a circumferentially grooved oil discharge passageway 9b communicated with the axially extending oil discharge passageway 9a and provided in the inner diametric surface of the motor casing 1.

Other structural features than those described above are similar to those employed in the fourth embodiment of the present invention shown in and described with particular reference to FIGS. 4A and 4B. For example, each of the ring shaped lid members 12 for closing the respective opposite ends of each of the stator core grooves 11 is rendered to have an L-sectioned configuration defined by a transverse piece portion 12a, which extends in the axial direction and is held in engagement with the adjacent end face of the stator core 4, and an upright piece portion 12b, which extends in the radial direction and engaged with the inner diametric surface of the motor casing 1, and the ring shaped lid members 12 are provided with respective cooling holes 14, communicated with the corresponding stator core groove 11 and opening towards the stator coil 5, so that a portion of the lubricant oil supplied from the oil supply passage 8 to the stator core grooves 11 can be injected from the cooling holes 14 in the lid members 12 onto the stator coil 5 to cause the stator coil 5 to be directly cooled.

According to the fifth embodiment described hereinabove, since that portion of the stator core 4 between the neighboring core portions 4a and 4a is molded with the filler 18 having a high thermal conductivity, heat emission emanating from a portion of the stator 2, which cannot be cooled with the lubricant oil, can be dissipated towards the stator core 4 having a high heat capacity, accompanied by a further increase of an effect of heat dissipation.

It is to be noted that the structure, in which that portion of the stator core 4 between the neighboring core portions 4a and 4a, is molded with the filler 18 having a high thermal conductivity as hereinbefore described, can be equally applied to the vehicle drive motor designed according to any one of the first to fourth embodiments shown in and described with reference to FIGS. 1A and 1B to FIGS. 4A to 4B, respectively, and, even in such case, similar effects can be equally obtained.

Figure 6A:
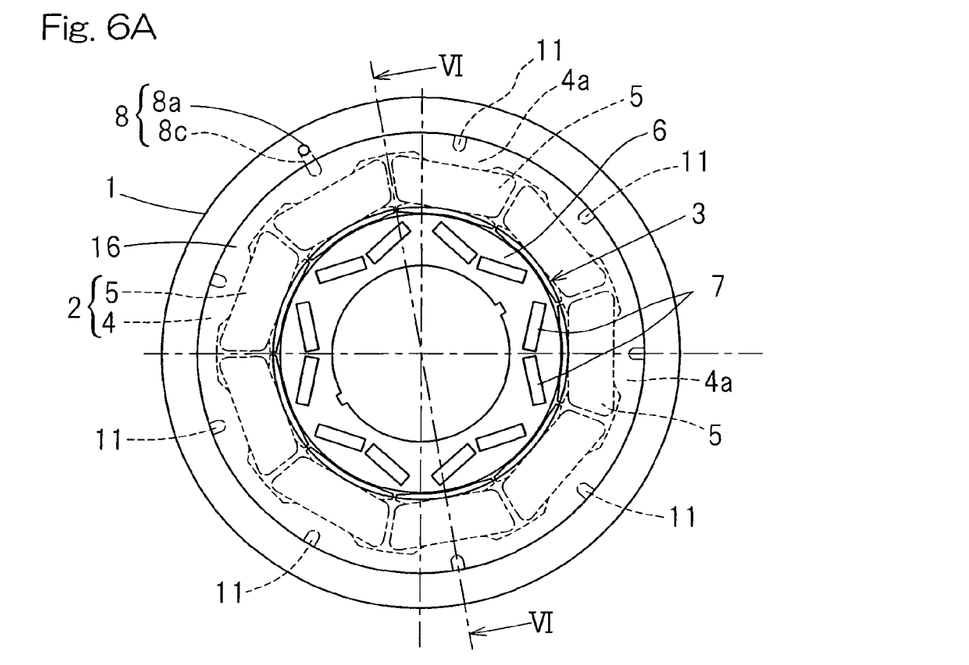
FIG. 6A is a front elevational view showing the vehicle drive motor according to a sixth embodiment of the present invention.
Figure 6B:
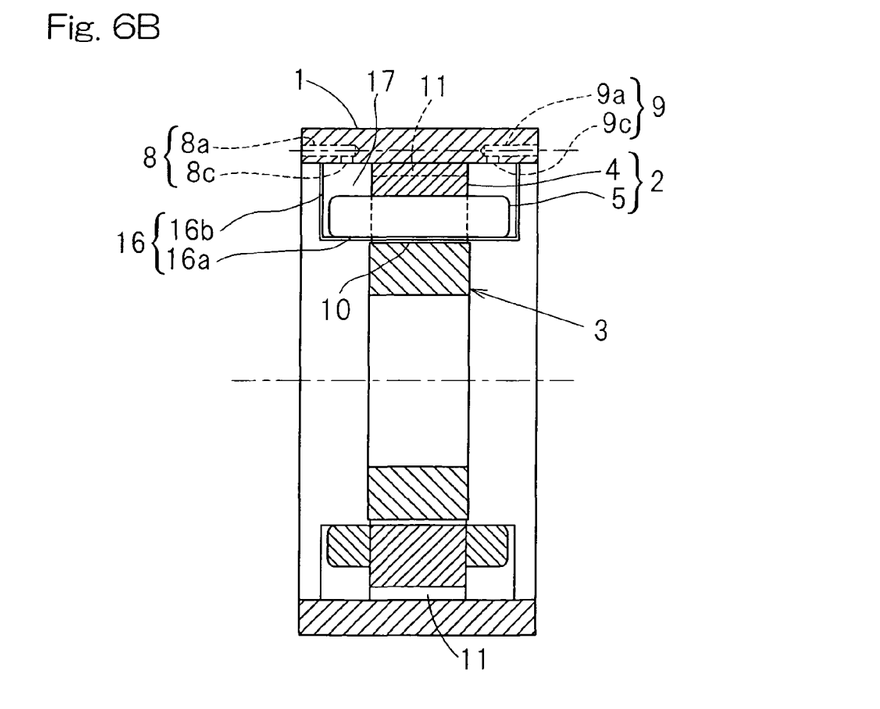
FIG. 6B is a cross sectional view taken along the line VI-VI in FIG. 6A.

FIGS. 6A and 6B illustrate a sixth embodiment of the present invention. FIG. 6A is a front elevational view showing the vehicle drive motor according to a sixth embodiment and FIG. 6B is a cross sectional view taken along the line VI-VI in FIG. 6A. The vehicle drive motor shown therein is similar to that according to the first embodiment shown in and described with particular reference to FIGS. 1A and 1B, but differs therefrom in that in place of the use of the ring shaped lid members 12, a ring shaped stator coverings 16 is employed. The stator covering 16 is so designed and so configured as to cover the entire inner periphery of the stator 2, except for the inner diametric side end thereof which form stator teeth (magnetic pole teeth) of the individual core portions 4a, and the opposite end faces of such stator 2, with its outer peripheral edge held in tight contact with an inner peripheral surface of the motor casing 1. The stator covering 16 referred to above is made up of an inner peripheral side cylindrical portion 16a and opposite side plate portions 16b on respective sides of the inner peripheral side cylindrical portion 16a. The inner peripheral side cylindrical portion 16a is provided with openings (not shown) through which the stator teeth (magnetic pole teeth) of the individual core portions 4a are exposed. It is to be noted that the stator covering 16, although having been shown and described as formed of one piece construction in the illustrated embodiment, may be constituted by a pair of split stator coverings opposite to each other.

The oil supply passage 8 defined in the motor casing 1 is made up of an axially extending oil supply passageway 8a, extending from one end face of the motor casing 1 in the axial direction, and a radially extending oil supply passageway 8c communicated with the axially extending oil supply passageway 8a and extending in the radial direction so as to open at the inner diametric surface of the motor casing 1 at a position inside of the stator covering 16. The oil discharge passage 9 includes passageway 9a, which is defined so as to extend from the opposite end face of the motor casing 1 in the axial direction, and a radially extending oil discharge passageway 9c defined in communication with the axially extending oil discharge passageway 9a and extending in the radial direction so as to open at the inner diametric surface of the motor casing 1 at a position inside of the stator covering 16. Other structural features than those described above are similar to those shown in and described with reference to FIGS. 1A and 1B in connection with the first embodiment.

According to the sixth embodiment, the lubricant oil, which is supplied through the oil supply passage 8 and concurrently serves as a cooling oil, fills up a cavity 17 defined within the stator covering 16 and is subsequently discharged through the oil discharge passage 9. The lubricant oil at an inflow side area on one side of the cavity 17 relative to the stator 2 flows towards an outflow side area thereof on the opposite side through gaps between the individual core portions 4a and then through the stator core grooves 11. Because of this, as shown and described with particular reference to FIGS. 1A and 1B, there is no need to provide the inner diametric surface of the motor casing 1 with either of the circumferentially grooved oil supply passageway 8*b* or the circumferentially grooved oil discharge passageway 9*b*, both extending in the circumferential direction.

Also according to the sixth embodiment described above, the entire stator coil 5 and a major portion of the stator core 4 can be immersed within an oil pool that is filled within the cavity 17 inside the stator covering 16 and can therefore be cooled by oil. Because of this, the stator 2 can be cooled yet further efficiently.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

[Reference Numerals]
- 1: Motor casing
- 1*a*: Reduced diameter portion of the motor casing
- 2: Stator
- 3: Rotor
- 4: Stator core
- 5: Stator coil
- 8: Oil supply passage
- 8*a*: Axially extending oil supply passageway
- 8*b*: Circumferentially grooved oil supply passageway
- 8*c*: Radially extending oil supply passageway
- 9: Oil discharge passage
- 9*a*: Axially extending oil discharge passageway
- 9*b*: Circumferentially grooved oil discharge passageway
- 9*c*: Radially grooved oil discharge passageway
- 11: Stator core groove
- 12: Lid member
- 12*a*: Transverse piece portion
- 12*b*: Upright piece portion
- 13: Bolt
- 14: Cooling hole
- 16: Stator covering
- 18: Fill

What is claimed is:

1. A vehicle drive motor comprising:
    a stator, which includes an annular stator core, provided in an inner periphery of a tubular motor casing, and a stator coil provided in the stator core;
    a rotor positioned on an inner peripheral side of the stator core and rotatable relative to the stator;
    an oil supply passage and an oil discharge passage provided in the motor casing and opening at respective locations on an inner diametric surface of the motor casing, which are opposite to each other in an axial direction; and
    one or more stator core grooves provided in an outer diametric surface of the stator core so as to extend in the axial direction and communicated with the oil supply passage and the oil discharge passage, in which a lubricant oil is allowed to flow from the oil supply passage towards the oil discharge passage through the stator core groove or grooves,
    wherein the oil discharge passage includes an axially extending oil supply passageway defined so as to extend axially from one end face of the motor casing, and a circumferentially grooved oil supply passageway defined in the inner diametric surface of the motor casing so as to extend in a circumferential direction and is communicated with the axially extending oil supply passageway, and
    wherein the oil discharge passage includes an axially extending oil discharge passageway defined so as to extend axially from the opposite end face of the motor casing, and a circumferentially grooved oil discharge passageway defined in the inner diametric surface of the motor casing so as to extend in the circumferential direction and is communicated with the axially extending oil discharge passageway.

2. The vehicle drive motor as claimed in claim 1, wherein the stator core groove is defined in the outer diametric surface of the stator core so as to extend from one end of the stator core to the opposite end thereof, and has opposite ends closed by respective ring shaped lid members provided on opposite ends of the stator core.

3. The vehicle drive motor as claimed in claim 1, wherein the stator core groove is defined in the outer diametric surface of the stator core so as to extend from one end of the stator core to the opposite end thereof, one of opposite ends of the stator core groove being closed by a ring shaped lid member provided on one end of the stator core while the other of the opposite ends of the stator core groove is closed by a stepped face of a reduced diameter portion formed in the inner diametric surface of the motor casing, the reduced diameter portion having a diameter smaller than that of a portion of the inner diametric surface of the motor casing, on which the stator core is mounted, and wherein the stator core is fixed to the motor casing by means of a bolt passing axially from the lid member and over the stator core groove and then threaded into the motor casing reduced diameter portion.

4. The vehicle drive motor as claimed in claim 2, wherein each of the lid members for closing the opposite ends of the stator core groove is provided with a coil cooling hole or groove communicated with the stator core groove and open towards the stator coil.

5. The vehicle drive motor as claimed in claim 2, wherein each of the lid members for closing the opposite ends of the stator core groove is of an L-sectioned configuration having a transverse piece portion that extends axially and is held in engagement with an end face of the stator core, and an upright piece portion that extends radially and is engaged with the inner diametric surface of the motor casing,
    wherein the oil supply passage includes an axially extending oil supply passageway defined so as to extend axially from one end face of the motor casing, and a radially extending oil supply passageway extending radially so as to open at the inner diametric surface of the motor casing at a position inside of the lid member, and
    wherein the oil discharge passage includes an axially extending oil discharge passageway defined so as to extend axially from the opposite end face of the motor casing, and a radially extending oil discharge passageway extending radially so as to open at the inner diametric surface of the motor casing at a position inside of the lid member.

6. The vehicle drive motor as claimed in claim 5, wherein each of the lid members for closing the opposite ends of the stator core groove is provided with a coil cooling hole opening towards the stator coil.

7. The vehicle drive motor as claimed in claim 1, wherein the stator comprises individual core portions arranged circumferentially with a stator coil being wound around those core portions, and a portion delimited between the neighboring individual core portions is molded with a filler having a high thermal conductivity.

8. The vehicle drive motor as claimed in claim 1, wherein the stator comprises:
- individual core portions arranged circumferentially, each individual core portion having a stator teeth wound with the stator coil; and
- a ring shaped stator covering for covering the entire inner periphery of the stator except for the stator teeth, and the opposite end faces of such stator, having an outer peripheral edge held in tight contact with an inner peripheral surface of the motor casing,
- wherein the oil supply passage and the oil discharge passage are spaced axially from each other and are made open towards a cavity formed inside the stator covering and the motor casing at respective portions of the inner diametric surface of the motor casing, so that the lubricant oil is supplied from the oil supply passage and concurrently serves as a cooling oil allows the stator and the stator coil to be immersed within an oil pool filled within the cavity.

* * * * *